United States Patent
Karlsson et al.

(10) Patent No.: US 7,315,930 B2
(45) Date of Patent: Jan. 1, 2008

(54) METHOD OF SELECTING HEURISTIC CLASS FOR DATA PLACEMENT

(75) Inventors: Magnus Karlsson, Mountain View, CA (US); Christos Karamanolis, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 326 days.

(21) Appl. No.: 10/698,182

(22) Filed: Oct. 30, 2003

(65) Prior Publication Data

US 2005/0097283 A1    May 5, 2005

(51) Int. Cl.
    *G06F 12/06*    (2006.01)
(52) U.S. Cl. .................. 711/170; 711/162; 707/10
(58) Field of Classification Search ............... 711/170, 711/171, 162; 707/8, 10
    See application file for complete search history.

(56) References Cited

U.S. PATENT DOCUMENTS

| | | | |
|---|---|---|---|
| 6,240,414 B1 * | 5/2001 | Beizer et al. | 707/8 |
| 6,374,227 B1 * | 4/2002 | Ye | 705/8 |
| 7,107,596 B2 * | 9/2006 | Brown et al. | 719/316 |
| 2002/0177989 A1 * | 11/2002 | Alvarez et al. | 703/22 |
| 2002/0184555 A1 * | 12/2002 | Wong et al. | 714/4 |

OTHER PUBLICATIONS

Mahmood, A. and H. U. Khan and H. A. Fatmi, Adaptive File Allocation in Distributed Computer Systems, Nov. 2, 1993, King's College London, University of London, 354-361.*

Poonawala, Mustafa, "Reusable Strategies for Testing Safety-Critical Systems", University of Minnesota, Sep. 1999, 136-150.*

Lo "Heuristics algorithms for task assignment in distributed systems" 1988 IEEE, pp. 1384-1397.*

Gehlsen et al. "A Framework for Distributed Simulation Optimization", 2001, pp. 508-514.*

Sugih Jamin, Cheng Jin, Anthony R. Kurc, Danny Raz and Yuval Shavitt, Constrained Mirror Placement on the Internet, INFOCOM, 2001.

Magnus Karlsson and Christos Karamanolis, Bounds on the Replication Cost for QoS, Technical Report HPL-2003-156, Hewlett-Packard Company, Palo Alto, CA, Jul. 24, 2003. <http://www.hpl.hp.com/techreports/2003/HPL-2003-156.pdf>.

Lili Qiu, Venkata N. Padmananabhan and Geoffrey M. Voelker, On the Placement of Web Server Replicas, INFOCOM, 2001.

Raj Tewari and Nabil R. Adam, Distributed File Allocation with Consistency Constraints, 1992.

Arun Venkataramani, Phoebe Weidmann, and Mike Dahlin, Bandwidth Constrained Placement in a WAN, 2001.

(Continued)

*Primary Examiner*—Pierre-Michel Bataille

(57) ABSTRACT

An embodiment of a method of selecting a heuristic class for data placement in a distributed storage system begins by forming a general integer program which models the data placement and forming a specific integer program which models a heuristic class for the data placement. The general and specific integer programs each comprising an objective of minimizing a replication cost. The method continues with solving the general integer program which provides a general lower bound for the replication cost and solving the specific integer program which provides a specific lower bound for the replication cost. The method concludes with selecting the heuristic class if a difference between the general lower bound and the specific lower bound is within an allowable amount.

27 Claims, 7 Drawing Sheets

| | Table 3 | | | | | |
|---|---|---|---|---|---|---|
| Heuristic class | Heuristic properties | | | | | |
| | Storage constraint | Replica constraint | route | know | hist | Reactive constraint |
| Storage constrained heuristics | x | | global | global | multi | |
| Replica constrained heurisitics | | x | global | global | multi | |
| Decentralized storage constrained heuristics w/ local routing | x | | local | local | multi | |
| Local caching | x | | local | local | single | x |
| Cooperative caching | x | | global | global | single | x |
| Local caching w/ prefetching | x | | local | local | single | |
| Cooperative caching w/ prefetching | x | | global | global | single | |

OTHER PUBLICATIONS

Alec Wolman, Geoffrey M. Voelker, Nitin Sharm, Neal Cardwell, Anna Karlin, and Henry M. Levy, On the Scale and Performance of Cooperative Web Proxy Caching, Proceedings of the 17th ACM Symposium on Operating Systems Principles, Kiawah Island, SC, pp. 16-31, ACM Press, New York, NY, 1999.

Kamal Jain, Mohammad Mahdian, Evangelos Markakis, Amin Saberi, and Vijay V. Vazirani, Greedy Facility Location Algorithms Analyzed Using Dual Fitting With Factor-Revealing LP, ArXiv, Cornell University, Ithica, NY, Jul. 9, 2002. < http://arxiv.org/PS_cache/cs/pdf/0207/0207028.pdf>.

P. Krishnan, Danny Raz, and Yuval Shavitt, The Cache Location Problem, IEEE/ACM Transactions on Networking, vol. 8, No. 5, pp. 568-582, ACM Press, New York, NY, Oct. 2000.

Magnus Karlsson, Christos Karamanolis, and Mallik Mahalingam, A Framework for Evaluating Replica Placement Algorithms, Technical Report, HPL-2002-219, Hewlett-Packard Company, Palo Alto, CA, Aug. 16, 2002. < http://www.hpl.hp.com/techreports/2002/HPL-2002-219.pdf>.

Magnus Karlsson, and Mallik Mahalingam, Do We Need Replica Placement Algorithms in Content Delivery Networks?, Technical Report HPL-2002-220, Hewlett-Packard Company, Palo Alto, CA, Aug. 16, 2002. < http://www.hpl.hp.com/techreports/2002/HPL-2002-220.pdf>.

Sridhar Rajagopalan, and Vijay V. Vazirani, Primal-dual RNC Approximation of Covering Integer Programs, 1999.

Haifeng Yu, and Amin Vahdat, Minimal Replication Cost for Availability, Jul. 2002.

Samy Mahmoud and J. S. Riordon, Optimal Allocation of Resources in Distributed Information Networks, ACM Transactions on Database Systems, vol. 1, No. 1, pp. 66-78, ACM Press, New York, NY, Mar. 1976.

Mark S. Daskin and Susan H. Owen, Partial Covering P-Center and Partial Covering Set Covering Models, Presentation, International Symposium on Location Decisions (ISOLDE VIII), Portugal, Jun. 23-29, 1999.

Susan Hesse Owen and Mark S. Daskin, Strategic Facility Location: A Review, vol. 111, Issue 3, pp. 423-447, European Journal of Operational Research, Elsevier Science B.V., Amsterdam, Netherlands, 1998.

Law rence W. Dowdy, Derrell V. Foster, Comparative Models of the File Assignment Problem, ACM Computing Surveys (CSUR), vol. 14, No. 2, pp. 287-313, ACM Press, New York, NY, Jun. 1982.

Pierre Chardaire, Facility Location Optimization and Cooperative Games, Ph.D. Thesis, pp. 46-62, Chapter 3 and pp. 175-184, Bibliography, School of Information Systems, University of East-Anglia, Norwich UK, 1998.

Magnus Karlsson and Christos Karamanolis, U.S. Appl. No. 10/698,263, Oct. 30, 2003.

Christos Karamanolis, and Magnus Karlsson, U.S. Appl. No. 10/698,264, Oct. 30, 2003.

Magnus Karlsson and Christos Karamanolis, U.S. Appl. No. 10/698,265, Oct. 30, 2003.

* cited by examiner

| Table 1 | | |
|---|---|---|
| Variable | Type | Description |
| $store_{nik}$ | Binary | nth node stores kth data object during ith interval |
| $create_{nik}$ | Binary | kth data object created on nth node during ith interval |
| $covered_{nik}$ | Binary | nth node can access kth data object w/in latency threshold during ith interval |
| $open_n$ | Binary | nth node is enabled; it can store replicas and run data placement heuristics |

FIG. 3

| Table 2 | | |
|---|---|---|
| Variable | Type | Description |
| $read_{nik}$ | Integer | Number of read requests from nth node for kth data object during ith interval |
| $write_{nik}$ | Integer | Number of write requests from nth node for kth data object during ith interval |
| $latency_{nm}$ | Real | Data access latency for accessing an object at mth node from nth node |
| $dist_{nm}$ | Binary | nth node can access mth node within latency threshold |
| $know_{nm}$ | Binary | nth node uses information from mth node to make placement decision |
| $fetch_{nm}$ | Binary | nth node can fetch data objects form mth node |
| $hist_{nik}$ | Binary | nth node has a record in its activity history of kth data object being accessed on nth node during ith interval |
| $T_{lat}$ | Real | Target latency threshold |
| $T_{qos}$ | Real | Specified ratio of accesses served within latency threshold |
| $\alpha$ | Integer | Unit cost for storage |
| $\beta$ | Integer | Unit cost for replica creation |
| $\gamma$ | Integer | Unit cost penalty for an access exceeding latency threshold |
| $\delta$ | Integer | Unit cost for an update message |
| $\zeta$ | Integer | Unit cost for enabling and managing a node |

FIG. 4

Table 3

| Heuristic class | Heuristic properties | | | | | |
|---|---|---|---|---|---|---|
| | Storage constraint | Replica constraint | route | know | hist | Reactive constraint |
| Storage constrained heuristics | x | | global | global | multi | |
| Replica constrained heurisitics | | x | global | global | multi | |
| Decentralized storage constrained heuristics w/ local routing | x | | local | local | multi | |
| Local caching | x | | local | local | single | x |
| Cooperative caching | x | | global | global | single | x |
| Local caching w/ prefetching | x | | local | local | single | |
| Cooperative caching w/ prefetching | | | global | global | single | |

FIG. 5

METHOD OF SELECTING HEURISTIC CLASS FOR DATA PLACEMENT

RELATED APPLICATIONS

This application is related to U.S. application Ser. Nos. 10/698,263, 10/698,264, and 10/698,265, filed on Oct. 30, 2003, the contents of which are hereby incorporated by reference.

FIELD OF THE INVENTION

The present invention relates to the field of data storage. More particularly, the present invention relates to the field of data storage where data is placed onto nodes of a distributed storage system.

BACKGROUND OF THE INVENTION

A distributed storage system includes nodes coupled by network links. The nodes store data objects, which are accessed by clients. By storing replicas of the data objects on a local node or a nearby node, a client can access the data objects in a relatively short time. An example of a distributed storage system is the Internet. According to one use, Internet users access web pages from web sites. By maintaining replicas on nodes near groups of the Internet users, access time for the Internet users is improved and network traffic is reduced.

Replicas of data objects are placed onto nodes of a distributed storage system using a data placement heuristic. The data placement heuristic attempts to find a near optimal solution for placing the replicas onto the nodes but does so without an assurance that the near optimal solution will be found. Broadly, data placement heuristics can be categorized as caching techniques or replication techniques. A node employing a caching technique keeps replicas of data objects accessed by the node. Variations of the caching technique include LRU (least recently used) caching and FIFO (first in first out) caching. A node employing LRU caching adds a new data object upon access by the node. To make room for the new data object, the node discards a data object that was most recently accessed at a time earlier than other data objects stored on the node. A node employing FIFO caching also adds a new data object upon access by the node but it discards a data object based upon load time rather than access time.

The replication techniques seek to make placement decisions about replicas of data objects typically in a more centralized manner than the caching techniques. For example, in a completely centralized replication technique, a single node of the distributed storage system decides where to place replicas of data objects for all data objects and nodes in the distributed storage system.

Currently, a system designer or system administrator seeking to deploy a placement heuristic in order to place replicas of data objects within a distributed storage system will choose a data placement heuristic in an ad-hoc manner. That is, the system designer or administrator will choose a particular data placement heuristic based upon intuition and past experience but without assurance that the data placement heuristic will perform adequately.

What is needed is a method of selecting a data placement heuristic with an expectation that the data placement heuristic will perform adequately and result in a low replication cost.

SUMMARY OF THE INVENTION

The present invention is a method of selecting a data placement heuristic class for a distributed storage system. According to an embodiment, the method begins by forming an integer program for each of a plurality of heuristic classes for the data placement. Each of the integer programs comprising an objective of minimizing a replication cost. The method continues with solving each of the integer programs which provide a minimum replication cost for each of the heuristic classes. The method concludes with selecting the heuristic class having a low replication cost.

According to another embodiment, the method of selecting the heuristic class begins with forming a general integer program which models the data placement and forming a specific integer program which models a heuristic class for the data placement. The general and specific integer programs each comprising an objective of minimizing a replication cost. The method continues with solving the general integer program which provides a general lower bound for the replication cost and solving the specific integer program which provides a specific lower bound for the replication cost. The method concludes with selecting the heuristic class if a difference between the general lower bound and the specific lower bound is within an allowable amount.

These and other aspects of the present invention are described in more detail herein.

BRIEF DESCRIPTION OF THE DRAWINGS

The present invention is described with respect to particular exemplary embodiments thereof and reference is accordingly made to the drawings in which:

FIG. 3 provides a table of decision variables according to an embodiment of the method of selecting the heuristic class of the present invention;

FIG. 4 provides a table of specified variables according to an embodiment of the method of selecting the heuristic class of the present invention;

FIG. 5 provides a table of heuristic classes and heuristic properties which model the heuristic classes according to an embodiment of the method of selecting the heuristic class of the present invention;

DETAILED DESCRIPTION OF A PREFERRED EMBODIMENT

Figure 1:
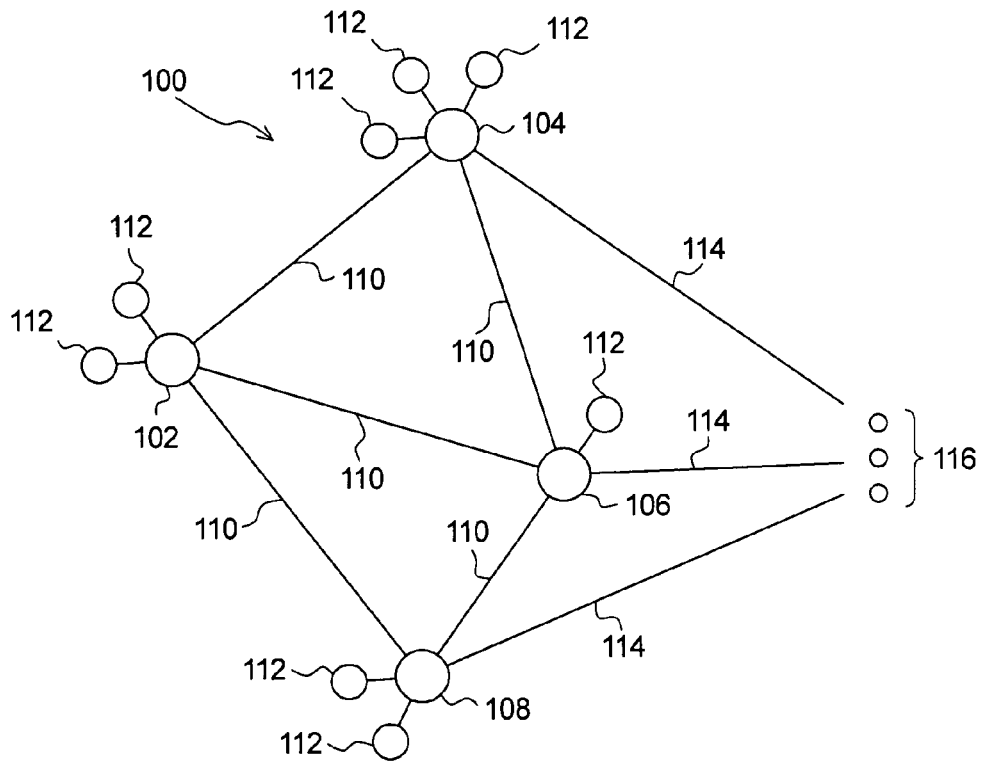
FIG. 1 illustrates an embodiment of a distributed storage system of the present invention.

Data is often accessed from geographically diverse locations. By placing a replica or replicas of data near a user or users, data access latencies can be improved. An embodiment for accomplishing the improved data access comprises a geographically distributed data repository. The geographically distributed data repository comprises a service that provides a storage infrastructure accessible from geographically diverse locations while meeting one or more performance requirements such as data access latency or time to update replicas. Embodiments of the geographically distributed data repository include a personal data repository and remote office repositories.

The personal data repository provides an individual with an ability to access the personal data repository with a range of devices (e.g., a laptop computer, PDA, or cell phone) and from geographically diverse locations (e.g., from New York on Monday and Seattle on Tuesday). When the individual opts for the personal data repository, data storage for the individual becomes a service rather than hardware, eliminating the need to physically purchase the hardware and eliminating the need to maintain it. For an individual who travels frequently, it would be especially beneficial in its elimination of the need to carry the hardware from place to place.

The provider of the personal data repository guarantees the performance requirements to the individual. In an embodiment of the personal data repository, the performance requirements comprise guaranteeing data access latency to files within a period of time, for example 1 sec. In another embodiment of the personal data repository, the performance requirements comprise a data bandwidth guarantee. For example, the data bandwidth guarantee could be guaranteeing that VGA quality video will be delivered without glitches. In another embodiment of the personal data repository, the performance requirements comprise an availability guarantee. For example, the availability guarantee could be guaranteeing that data will be available 99% of the time.

Other features envisioned for the personal data repository include data security, backup services, and retrieval services. The data security for the individual can be ensured by providing an access key to the individual. The backup and retrieval services could form an integral part of the personal data repository. The personal data repository also provides a convenient mechanism for the individual to share data with others, for example, by allowing the individual to maintain a personal web log. It is anticipated that the personal data repository would be available to the individual at a cost comparable to hardware based storage.

The remote office repositories provide employees with access to shared files. The performance requirements for the remote office repositories could be data access latency, data bandwidth, or guaranteeing that other employees would see changes to the shared files within an update time period. For example, the update time period could be 5 minutes. Other features envisioned for the remote office repositories include the data security, backup services, and retrieval services of the personal data repository.

An exemplary embodiment of the remote office repositories comprises a system configured for a digital movie production studio. The system allows an employee to work on an animation scene from home using a laptop incapable of holding the animation scene by meeting certain performance requirements of data access latency and data bandwidth. Upon updating the animation scene, other employees of the digital movie production studio that have authorized access would be able to see the changes to the animation scene within the update time period.

The present invention addresses the performance requirements of geographically distributed data repositories while seeking to minimize a replication cost. According to an aspect, the present invention comprises a method of selecting a heuristic class for data placement from a set of heuristic classes. Each of the heuristic classes comprises a method of data placement. The method of selecting the heuristic class seeks to minimize the replication cost by selecting the heuristic class that provides a low replication cost while meeting the performance requirement.

Each of the heuristic classes represents a range of data placement heuristics. A heuristic comprises a method employed by a computer that uses an approximation technique to attempt to find a near optimal solution but without an assurance that the approximation technique will find a near optimal solution. Heuristics work well at finding the quasi optimum solution provided that a problem definition for a particular problem falls within a range of problem definitions appropriate for a selected heuristic.

One skilled in the art will recognize that the term "heuristic" can be employed narrowly to define a search technique that does not provide a result which can be compared to a theoretical best result or it can be employed more broadly to include approximation algorithms which provide a result which can be compared to a theoretical best result. In the context of the present invention, the term "heuristic" is used in the broad sense, which includes the approximation algorithms. Thus, the term "approximation technique" should be read broadly to refer to both heuristics and approximation algorithms.

An embodiment of the method of selecting the heuristic class comprises solving a general integer program to determine a general lower bound for the replication cost, solving a specific integer program to determine a specific lower bound for the replication cost for a heuristic class, and comparing the general lower bound to the specific lower bound. In this embodiment, the method selects the heuristic class if the specific lower bound is within an allowable limit of the general lower bound.

Another embodiment of the method of selecting the heuristic class comprises solving first and second specific integer programs for each of first and second heuristic classes to determine first and second specific lower bounds for the replication cost for each of the first and second heuristic classes. In this embodiment, the method selects the first or second heuristic class depending upon a lower of the first or second specific lower bounds, respectively.

A further embodiment of the method of selecting the heuristic class comprises solving the general integer program and the first and second specific integer programs. In this embodiment, the method selects the first or second heuristic class depending upon a lower of the first or second specific lower bounds, respectively, if the lower of the first or second specific lower bounds is within the allowable lime of the general lower bound.

The general and specific integer programs for determining the general and specific lower bounds for the replication costs are NP-hard. (The term "NP-hard" means that there is no known algorithm that can solve the problem within any feasible time period, unless the problem size is small.) Thus, an exact solution is only available for a small system. According to an aspect, the present invention comprises a method of determining a lower bound for the replication cost where the lower bound comprises the general lower bound (for any conceivable heuristic) or the specific lower bound (for a specific class of heuristics). An embodiment of the method of determining the lower bound comprises solving an integer program using a linear relaxation of binary variables to determine a lower limit on the lower bound and performing a rounding algorithm until all of the binary variables have binary values, which determines an upper limit on an error for the lower bound.

According to another aspect, the present invention comprises a method of instantiating a data placement heuristic using an input of a plurality of heuristic parameters. In an embodiment of the method of instantiating the data placement heuristic, a node of a distributed storage system receives the heuristic parameters and runs an algorithm, which places data objects on nodes that are within a designated set of nodes. In another embodiment of the method of instantiating the data placement heuristic, a system simulating a node of a distributed storage system receives the heuristic parameters and runs the algorithm, which simulates placing data objects on nodes that are within a node scope.

According to a further aspect, the present invention comprises a method of determining data placement for the distributed storage system. In an embodiment of the method of determining the data placement, a system implementing the method selects a heuristic class and instantiates a data placement heuristic using the heuristic class. Another embodiment comprises selecting the heuristic class, instantiating the data placement heuristic, and evaluating a resulting data placement. In one embodiment, the step of evaluating the resulting data placement comprises simulating implementation of the data placement on a system experiencing a workload. In another embodiment, the step of evaluating the resulting data placement comprises simulating implementation of the data placement on at least two different system configurations experiencing a workload in order to determine which of the system configurations provides better efficiency or better performance. In a further embodiment, the step of evaluating the resulting data placement comprises implementing the data placement on a distributed storage system experiencing an actual workload.

An embodiment of a distributed storage system of the present invention is illustrated schematically in FIG. 1. The distributed storage system 100 comprises first through fourth nodes, 102 . . . 108, coupled by network links 110. Clients 112 coupled to the first through fourth nodes, 102 . . . 108, access data objects within the distributed storage system 100. Additional network links 114 couple the first through fourth storage nodes, 102 . . . 108, to additional nodes 116. Each of the first through fourth nodes, 102 . . . 108, and the additional nodes 116 comprises a storage media for storing the data objects. Preferably, the storage media comprises one or more disks. Alternatively, the storage media comprises some other storage media such as a tape. A data placement heuristic of the present invention places replicas of the data objects onto the first through fourth nodes, 102 . . . 108, and the additional nodes 116.

Mathematically, the first through fifth nodes, 102 . . . 108, and the additional nodes 116 are discussed as n nodes where n∈{1, 2, 3, . . . N}, where N is the number of nodes. Also, the data objects are discussed mathematically as k data objects where k∈{1, 2, 3, . . . K}, where K is the number of data objects.

While the distributed storage system 100 is depicted with the n nodes, it will be readily apparent to one skilled in the art that the methods of the present invention apply to the distributed storage system 100 having as few as two of the nodes.

Figure 2:
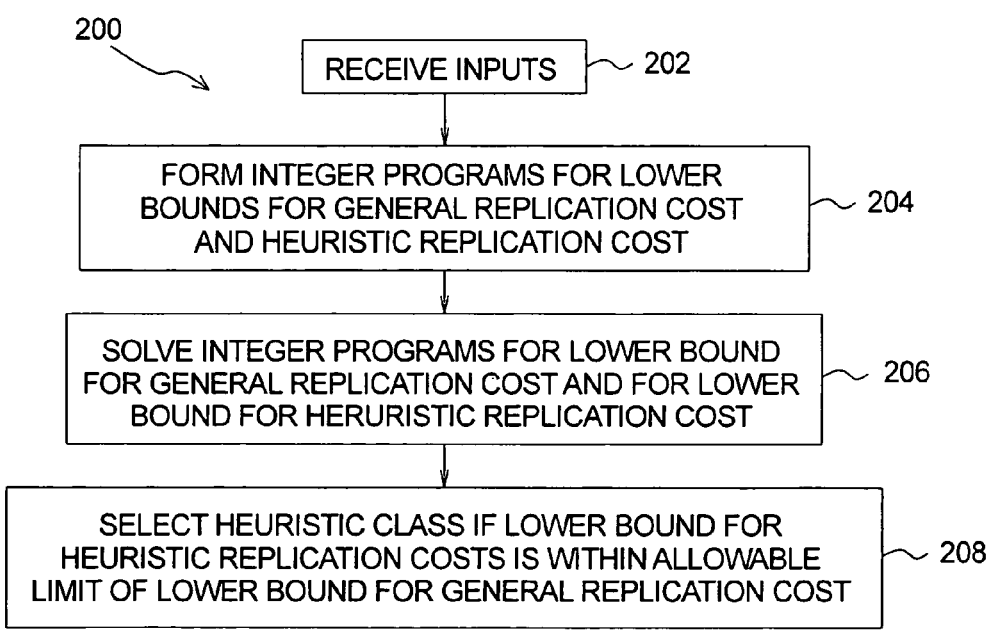
FIG. 2 illustrates an embodiment of a method of selecting a heuristic class for data placement in a distributed storage system of the present invention as a flow chart.

An embodiment of the method of selecting the heuristic class for the data placement of the present invention is illustrated as a flow chart in FIG. 2. The method of selecting the heuristic class 200 begins in a first step 202 of receiving inputs. The inputs comprise a system configuration, a workload, and a performance requirement. The system configuration represents the distributed storage system 100. The workload represents users requesting data objects from the n nodes. The performance requirement comprises a bi-modal performance metric, which comprises a criterion and a ratio of successful attempts to total attempts. According to one embodiment, the performance requirement comprises a data access latency specified as a period of time for fulfilling a ratio of successful data accesses to total data accesses. An exemplary data access latency comprises data access within 250 ms for 99% of data access requests. According to another embodiment, the performance requirement comprises a data access bandwidth, a data update time, an availability, or an average data access latency.

The method of selecting the heuristic class 200 continues in a second step 204 of forming integer programs. According to an embodiment, the integer programs comprise the general integer program and the specific integer program. The general integer program models data placement irrespective of a data placement heuristic used to place the data objects. Solving the general integer program provides the general lower bound for the replication cost, which provides a reference for evaluating the heuristic class. The specific integer program models the heuristic class. The specific integer program comprises the general integer program plus one or more additional constraints.

The general and specific integer programs model the n nodes storing replicas of the k data objects. Each of the n nodes has a demand for some of the k data objects, which are requests from one or more users on the node. The one or more users can be one or more of the clients 112 or the user can be the node itself. The replicas of the k data objects can be created on or removed from any of the n nodes. These changes occur at the beginning of an evaluation interval. The evaluation interval comprises a time period between executions of the data placement heuristic for one of the n nodes. For example, a caching heuristic which is run upon the first node 102 for every access of any of the k data objects from the first node 102 has an evaluation interval of every access. In contrast, a complex centralized placement heuristic which is run once a day has an evaluation interval of 24 hours.

According to an embodiment, an evaluation interval period $\Delta$, i.e., a unit of time, is used to model the evaluation intervals even for the caching heuristic. An execution of a data placement heuristic comprises a set of all of the evaluation intervals modeled by the general and specific integer programs. Mathematically, the evaluation intervals are discussed herein as i evaluation intervals where i∈{1, 2, 3, . . . I}, where I is the number of evaluation intervals. A selection of the evaluation interval period $\Delta$ should reflect the heuristic class that is modeled by the specific integer program for at least two reasons. First, as the evaluation interval period $\Delta$ decreases, a total number of the i evaluation intervals increases. This increases a number of computations for solving the general and specific integer programs and, consequently, increases a solution time. Second, as the evaluation interval period $\Delta$ decreases, the specific lower bound theoretically converges to a lowest possible value. The lowest possible value may be far lower than the replication cost for an actual implementation of a data placement heuristic.

According to an embodiment, the evaluation interval period $\Delta$ is selected in one of two ways depending upon the heuristic class that is being modeled. For heuristic classes that perform placements every P units of time, the evaluation interval period $\Delta$ is given by $\Delta = P_{min}/2$, where $P_{min}$ is a smallest evaluation interval period on any of the n nodes for the execution of a data placement heuristic. For heuristic classes that perform placements after every access on an nth node, the evaluation interval period $\Delta$ is a minimum time between any two accesses of any of the n nodes.

The integer programs include decision variables and specified variables. According to an embodiment, the decision variables comprise variables selected from variables listed in Table 1, which is provided as FIG. 3. According to an embodiment, the specified variables comprise variables selected from variables listed in Table 2, which is provided as FIG. 4.

The general integer program comprises an objective of minimizing the replication cost. According to an embodiment, the objective of minimizing the replication cost is given as follows.

$$\sum_{i \in I} \sum_{n \in N} \sum_{k \in K} (\alpha \cdot store_{nik} + \beta \cdot create_{nik})$$

According to an embodiment, the general integer program further comprises general constraints. A first general constraint imposes the performance requirement on each of the nodes by constraining the decision variables so that the ratio of the successful accesses to the total accesses is at least a specified ratio $T_{qos}$. According to an embodiment, the first general constraint is given as follows.

$$\frac{\sum_{i \in I} \sum_{k \in K} read_{nik} \cdot covered_{nik}}{\sum_{i \in I} \sum_{k \in K} read_{nik}} \geq T_{qos} \; \forall n$$

A second general constraint imposes a condition that, if a replica of a kth data object is created on an nth node in an ith evaluation interval, the replica exists for the ith evaluation interval. According to an embodiment, the second general constraint is given as follows.

$$create_{nik} \geq store_{nik} - store_{n,i-1,k} \; \forall n,i,k$$

A third general constraint imposes a condition that initially no replicas exist in the distributed storage system. According to an embodiment, the third general constraint is given as follows.

$$store_{n,-1,k} = 0 \; \forall n,k$$

In an alternative embodiment, the third general constraint is modified to account for an initial placement of replicas of the k data objects on the n nodes.

A fourth general constraint imposes the condition that the nth node can access an mth node within a latency threshold $T_{lat}$. According to an embodiment, the fourth general constraint is given as follows.

$$covered_{nik} \leq \sum_{m \in N} dist_{nm} \cdot store_{mik} \; \forall n, i, k$$

A fifth general constraint imposes a condition that variables $store_{nik}$, $covered_{nik}$, and $create_{nik}$ are binary variables. According to an embodiment, the fifth general constraint is given as follows.

$$store_{nik}, covered_{nik}, create_{nik} \in \{0, 1\} \; \forall n,i,k$$

According to an alternative embodiment, a penalty term is added to the objective of minimizing the replication cost. The penalty term reflects a secondary objective of minimizing data access latencies $latency_{nm}$ which exceed the latency threshold $T_{lat}$. According to an embodiment, the penalty term is given as follows.

$$\gamma \sum_{i \in I} \sum_{n \in N} \sum_{k \in K} \left( read_{nik} \cdot (1 - covered_{nik}) \cdot \sum_{m \in N} (latency_{nm} - T_{lat}) \cdot route_{nmik} \right)$$

According to an alternative embodiment, a first additional cost term is added to the objective of minimizing the replication cost. The first additional term captures a cost of writes in the distributed storage system. According to an embodiment, the first additional cost term is given as follows.

$$\delta \sum_{i \in I} \sum_{n \in N} \sum_{k \in K} \left( write_{nik} \cdot \sum_{m \in N} store_{mik} \right)$$

According to an alternative embodiment, a second additional cost term is added to the objective of minimizing the replication cost. The second additional cost term reflects a cost of enabling a node to run a data placement heuristic and to store replicas of the k data objects. According to an embodiment, the second additional cost term is given as follows.

$$\zeta \cdot \sum_{n \in N} open_n$$

According to the alternative embodiment which includes the second additional cost term, additional general constraints are added to the general constraints. The additional general constraints impose conditions that an enablement variable $open_n$ is a binary variable and that the nth node must be enabled in order to store the k data objects on it. According to an embodiment, the additional general constraints are given as follows.

$$open_n \in \{0, 1\} \; \forall n$$

$$open_n \geq store_{nik} \; \forall n,i,k$$

An embodiment of the specific integer programs adds one or more supplemental constraints to the general constraints of the general integer program. According to an embodiment, the supplemental constraints comprise constraints chosen from a group comprising a storage constraint, a replica constraint, a routing knowledge constraint, an activity history constraint, and a reactive placement constraint.

The storage constraint reflects a heuristic property that a fixed amount of storage is used throughout an execution of a data placement heuristic. For example, caching heuristics exhibit the heuristic property of using the fixed amount of storage. Thus, if the first integer program models a caching heuristic it would include the storage constraint. A global storage constraint imposes a condition of a fixed amount of storage for all of the n nodes and over all of the i intervals.

According to an embodiment, the global storage constraint is given as follows.

$$\sum_{k \in K} store_{nik} = \sum_{k \in K} store_{0,0,k} \ \forall n, i$$

A local storage constraint imposes a condition of a fixed amount of storage over all of the i intervals and for each of the n nodes but it allows the fixed amount of storage to vary between the n nodes. According to an embodiment, the local storage constraint is given as follows.

$$\sum_{k \in K} store_{nik} = \sum_{k \in K} store_{n,0,k} \ \forall n, i$$

The replica constraint reflects a heuristic property that a fixed number of replicas for each of the k data objects are used throughout an execution of a data placement heuristic. Typically, centralized data placement heuristics use the fixed number of replicas. Thus, if the second integer program models a centralized data placement heuristic, it is likely to include the replica constraint. A first replica constraint imposes a condition of a fixed number of replicas for all of the k data objects and over all of the i intervals irrespective of demand for the k data objects. According to an embodiment, the first replica constraint is given as follows.

$$\sum_{n \in N} store_{nik} = \sum_{n \in N} store_{n,0,0} \ \forall i, k$$

A second replica constraint imposes a condition of a fixed number of replicas over all of the i intervals and for each of the k data objects but it allows the number of replicas to vary between the k data objects. According to an embodiment, the second replication constraint is given as follows.

$$\sum_{n \in N} store_{nik} = \sum_{n \in N} store_{n,0,k} \ \forall i, k$$

The routing knowledge constraints reflect a heuristic property of whether a node has knowledge of which others of the n nodes hold replicas of the k data objects. For example, if the nodes of a distributed storage system are using a caching heuristic, a node knows of the replicas stored on itself but has no knowledge of other replicas stored on other nodes. In such a scenario, if the node receives a request for a data object not stored on the node, the node requests the data object from an origin node. If the nodes of the distributed storage system are running a cooperative caching heuristic, a node knows of the replicas stored on nearby nodes or possibly all nodes. And if the distributed storage system is running a centralized heuristic, a node knows a closest node from which it can fetch a replica. According to an embodiment, the routing knowledge constraints employ a routing knowledge matrix $fetch_{nm}$ where $fetch_{nm}=1$ if an nth node knows of the replicas stored on an mth node and $fetch_{nm}=0$ otherwise. According to the embodiment, the routing knowledge constraints are given as follows.

$$covered_{nik} \leq \sum_{m \in N} dist_{nm} \cdot store_{mik} \cdot fetch_{nm} \ \forall n, i, k$$

$$route_{nmik} - fetch_{nm} \leq 0 \ \forall n, m, i, k$$

An embodiment of the activity history constraint discussed below makes use of a sphere of knowledge matrix $know_{nm}$. When a data placement heuristic makes a placement decision for a node, the data placement heuristic takes into account activity at the node and potentially other nodes in the distributed storage system. For example, a caching heuristic makes placement decisions for a node based only on accesses to the node running the caching heuristic. Thus, when the caching heuristic is employed, the sphere of knowledge for a node is local. Or for example, a centralized heuristic makes placement decisions for all nodes in a distributed storage system based on accesses to all of the nodes. Thus, when the distributed storage system employs the centralized heuristic, the sphere of knowledge for a node is global. If a cooperative caching heuristic is employed, the sphere of knowledge for a node is regional. The sphere of knowledge matrix $know_{nm}$ indicates whether knowledge of accesses originating at an mth node is used to make placement decisions at an nth node. If so, $know_{nm}=1$; and if not, $know_{nm}=0$.

The activity history constraint reflects whether a data placement heuristic makes a placement decision based upon activity in one or more evaluation intervals. The one or more evaluation intervals include a current evaluation interval and previous evaluation intervals up to a specified number of intervals. If the current evaluation interval is used to make the placement decision, the placement decision is a forecast of a future event since the placement decision is made at the beginning of an evaluation interval. This is referred to as prefetching. If the previous evaluation interval is used to make the placement decision, the placement decision is based upon previous accesses for a data object.

The activity history constraint imposes the condition that a replica of a data object can be created if the data object has been created within the history and if the history is within a node's sphere of knowledge. For example, if a caching heuristic is employed, a replica of a data object is created if the data object was accessed within a single preceding interval by a node running the caching heuristic. Or for example, if a centralized placement heuristic is employed and if the history is all intervals, a data placement heuristic considers the data objects accessed within the global sphere of knowledge. According to the embodiment of the activity history constraint, an activity history matrix $hist_{nik}$ indicates whether an nth node accessed a kth data object during or before an ith interval within a history considered by a data placement heuristic. If so, $hist_{nik}=1$; if not, $hist_{nik}=0$. According to the embodiment, the activity history constraint is given as follows.

$$create_{nik} \leq \sum_{m \in N} hist_{nik} \cdot know_{nm} \ \forall n, i, k$$

The reactive placement constraint reflects whether the prefetching is precluded. If the prefetching is precluded for a data placement heuristic, it is reactive heuristic. The reactive placement constraint imposes the condition that the activity history constraint cannot consider a current evaluation interval. For example, if a simple caching heuristic is employed, a replica of a data object is created if the data object was accessed within a single preceding interval by a node running the simple caching heuristic. Thus, for the simple caching heuristic, the prefetching is precluded. According to an embodiment, the reactive placement constraints are given as follows.

$$create_{nik} \leq \sum_{m \in N} hist_{n,i-1,k} \cdot know_{nm} \; \forall \, n, i, k$$

Solving the general integer program provides a general lower bound for the replication cost that applies to any data placement heuristic or algorithm. Solving the specific integer program provides the specific lower bound for the replication cost corresponding to a heuristic class for data placement. According to an embodiment, the heuristic class is described by heuristic properties, which comprise the supplemental constraints and other heuristic properties such as the sphere of knowledge matrix $know_{nm}$ and the activity history matrix $hist_{nik}$. According to an embodiment, some heuristic classes along with the heuristic properties which model them are listed in Table 3, which is provided as FIG. 5.

The method of selecting the heuristic class 200 (FIG. 2) continues in a third step 206 of solving the general and specific integer programs. According to an embodiment, solving each of the general and specific integer programs comprises an instantiation of the method of determining the lower bound. The method of determining the lower bound of the present invention is discussed above and more fully below. According to an alternative embodiment, the third step 206 of solving the general and specific integer programs comprises an exact solution of the general or specific integer program. The alternative embodiment is less preferred because the exact solution is only available for a system configuration having a limited number of nodes.

The method of selecting the heuristic class 200 concludes in a fourth step 208 of selecting the heuristic class corresponding to the specific integer program if the specific lower bound for the replication cost of the heuristic class is within an allowable limit of the general lower bound. The allowable limit comprises a judgment made by an implementer depending upon such factors as the general lower bound (a lower general bound makes a larger allowable limit palatable), a cost of solving an additional specific integer program, and prior acceptable performance of the heuristic class modeled by the specific integer program. Typically, the implementer will be a system designer or system administrator who makes similar judgments as a matter of course in performing their tasks.

An alternative embodiment of the method of selecting the heuristic class comprises forming and solving the general integer program and a plurality of specific integer programs where each of the specific integer programs model a heuristic class. For example, a specific integer program could be formed for each of seven heuristic classes identified in Table 3 (FIG. 5). The alternative embodiment further comprises selecting the heuristic class which corresponds to the specific lower bound for the replication cost having a low value if the specific lower bound is within the allowable limit of the general lower bound.

An embodiment of the method of determining the lower bound of the present invention comprises solving an integer program using a linear relaxation of binary variables and performing a rounding algorithm. The integer program comprises the general integer program or the specific integer program. The binary variables comprise the decision variables $store_{nik}$ of the general integer program or of the specific integer program. Solving the integer program using the linear relaxation of the binary variables provides a lower limit for the lower bound. The rounding algorithm provides an upper limit for the lower bound.

Figure 6A:
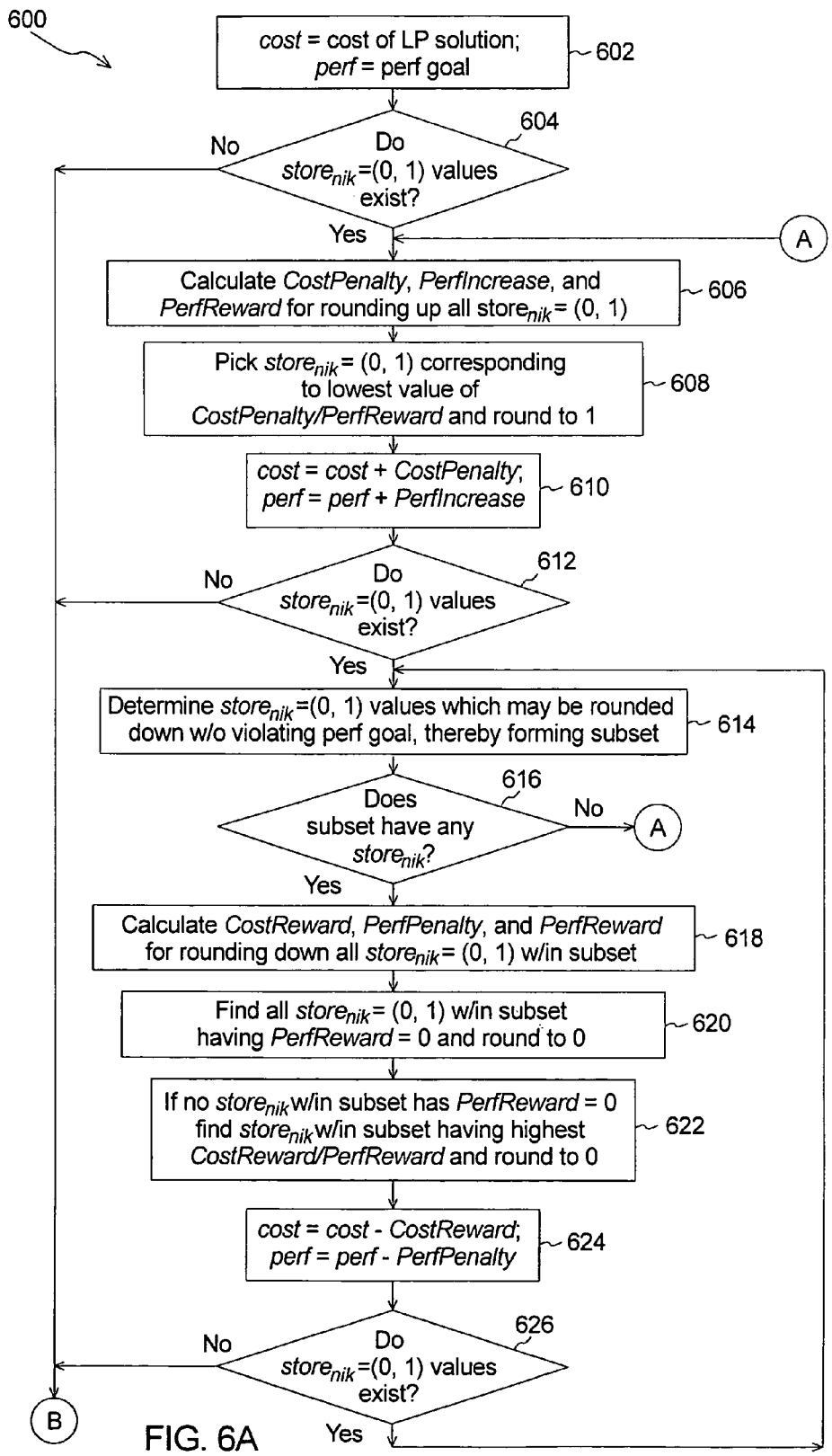
FIG. 6 illustrates an embodiment of a rounding algorithm of the present invention as a flow chart.
Figure 6B:
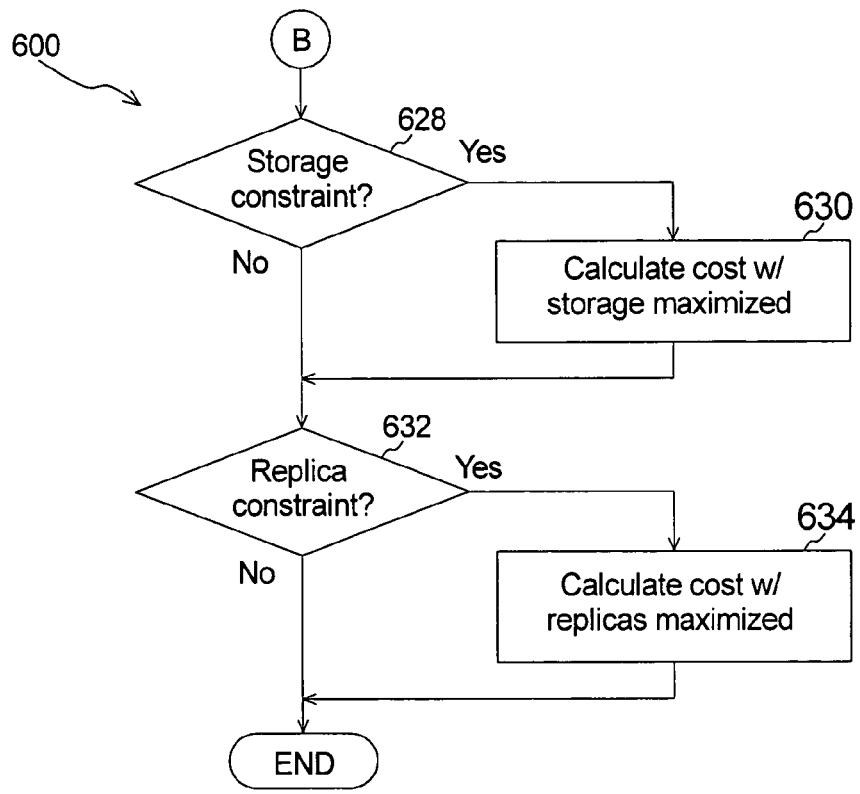

An embodiment of the rounding algorithm of the present invention is illustrated as a flow chart in FIGS. 6A and 6B. The rounding algorithm 600 begins in a first step 602 of receiving a cost, which has an initial value of the lower limit for the lower bound determined from the solution of the integer program using the linear relaxation of the binary variables. The first step 602 further comprises receiving a performance, which has an initial value of the performance requirement. According to an embodiment of the rounding algorithm 600, the performance requirement comprises the specified ratio of successful accesses to total accesses $T_{qos}$.

A second step 604 of the rounding algorithm 600 comprises determining whether any of the decision variables $store_{nik}$ have non-binary values. If not, the method ends because the linear relaxation of the binary variables has provided a binary result. However, this is unlikely. The decision variables $store_{nik}$ which have the non-binary values comprise a first subset.

The rounding algorithm continues in a third step 606, which comprises calculating a cost penalty, a performance increase, and a performance reward for each of the decision variables $store_{nik}$ within the first subset. According to an embodiment, the cost penalty CostPenalty is given by CostPenalty=$\alpha \cdot (1-store_{nik})$, where $\alpha$=the unit cost of storage. According to an embodiment, the performance increase PerfIncrease is given as follows.

$$PerfIncrease = \frac{(covered_{nik})_{binary} - (covered_{nik})_{nonbinary}}{\sum_{i \in I} \sum_{k \in K} read_{nik}}$$

Because the value of $covered_{nik}$ is constrained by the fourth general constraint above to a value no greater than one and because the non-binary value of $covered_{nik}$ may already have a value of one, the performance increase PerfIncrease may be found to be zero.

According to an embodiment, the performance reward PerfReward is given as follows.

$$PerfReward = \frac{(covered_{nik})_{binary}}{\sum_{i \in I} \sum_{k \in K} read_{nik}}$$

Unlike the performance increase PerfIncrease, the performance reward PerfReward will have a value greater than zero provided that the binary value of $covered_{nik}$ is one.

In a fourth step 608, the rounding algorithm picks the binary variable $store_{nik}$ from the subset which corresponds to a lowest ratio of the cost penalty CostPenalty to the performance reward PerfReward (i.e., a lowest value of CostPenalty/PerfReward) and removes it from the first subset. A fifth step 610 calculates the cost as a current cost value plus the cost penalty CostPenalty and calculates the performance as the current performance plus the performance increase PerfIncrease. A sixth step 612 determines whether any of the decision variables store$_{nik}$ remain in the first subset. If not, the method ends. Otherwise, the method continues.

In a seventh step 614, the rounding algorithm 600 determines which of the decision variables store$_{nik}$ within the first subset may be rounded down without violating the performance requirement. The decision variables store$_{nik}$ within the first subset which may be rounded down without violating the performance requirement comprise a second subset. An eighth step 616 determines whether the second subset includes any of the decision variables store$_{nik}$. If not, the rounding algorithm 600 returns to the third step 606. If so, the method continues.

In a ninth step 618, a cost reward CostReward, a performance penalty PerfPenalty, and the performance reward PerfReward are calculated for the binary variables store$_{nik}$ which remain in the second subset. According to an embodiment, the cost penalty CostReward is given by CostReward=α·store$_{nik}$, where α=the unit cost of storage. According to an embodiment, the performance increase PerfPenalty is given as follows.

$$PerfPenalty = \frac{(covered_{nik})_{nonbinary} - (covered_{nik})_{binary}}{\sum_{i \in I} \sum_{k \in K} read_{nik}}$$

A tenth step 620 determines whether the second subset contains one or more binary variables store$_{nik}$ with the performance reward PerfReward having a value of zero. If so, the one or more binary variables are rounded to zero and removed from the first subset. If not, an eleventh step 622 finds the binary variable store$_{nik}$ within the second subset with a highest ratio of the cost reward CostReward to the performance reward PerfReward (i.e., a highest value CostReward/PerfReward), rounds this binary variable to zero, and removes it from the first subset. A twelfth step 624 calculates the cost as a current cost value minus the cost reward CostReward and calculates the performance as a current performance minus the performance penalty PerfPenalty. An thirteenth step 626 determines whether any of the decision variables store$_{nik}$ remain in the first subset. If not, the method ends. Otherwise, the method continues by returning to the seventh step 314.

When the rounding algorithm 600 finds that no binary variables remain in the first subset, a fourteenth step 628 determines whether the integer program includes the storage constraint. If so, a fifteenth step 630 calculates the cost with storage maximized within an allowable storage. According to an embodiment, the storage constraint comprises a global storage constraint. According to an embodiment which includes the global storage constraint, the cost calculated in the fifteenth step 630 is given as follows.

$$cost = cost_c + \alpha \sum_{i \in I} \sum_{n \in N} \left( c_{\max} - \sum_{k \in K} store_{nik} \right) + \beta \sum_{n \in N} (c_{\max} - c_n)$$

where cost$_c$ is the cost determined by the rounding algorithm prior to reaching the fiffourteenth step 630, where $c_{max}$ is a maximum number of data objects stored on any of the n nodes during any of the i intervals, and where $c_n$ is a maximum number of data objects stored on an nth node during any of the i intervals. According to another embodiment, the storage constraint comprises a nodal storage constraint. According to an embodiment which includes the nodal storage constraint, the cost calculated in the fifteenth step 630 is given as follows.

$$cost = cost_c + \alpha \sum_{i \in I} \sum_{n \in N} \left( c_n - \sum_{k \in K} store_{nik} \right)$$

A sixteenth step 632 determines whether the integer program includes the replica constraint. If so, a seventeenth step 634 calculates the cost with replicas maximized within an allowable number of replicas. According to an embodiment, the replica constraint comprises a global replica constraint. According to an embodiment which includes the global replica constraint, the cost calculated in the seventeenth step 634 is given as follows.

$$cost = cost_c + \alpha \sum_{i \in I} \sum_{k \in K} \left( d_{\max} - \sum_{n \in N} store_{nik} \right) + \beta \sum_{k \in K} (d_{\max} - d_n)$$

where $d_{max}$ is a maximum number of replicas of any of the k data objects stored during any of the i intervals and where $d_n$ is a maximum number of replicas of a kth data object during any of the i intervals. According to an embodiment, the replica constraint comprises an object specific replica constraint. According to an embodiment which includes the object specific replica constraint, the cost calculated in the seventeenth step 634 is given as follows.

$$cost = cost_c + \alpha \sum_{i \in I} \sum_{k \in K} \left( d_n - \sum_{n \in N} store_{nik} \right)$$

The method of determining the lower bound ends when the rounding algorithm 600 finds that no binary variables store$_{nik}$ remain in the subset and after considering whether the integer program includes the storage or replica constraint. If the integer program does not include the storage or replica constraint, the cost calculated in the fifth or twelfth step, 610 or 624, forms the upper limit on the lower bound. If the integer program includes the storage constraint, the cost calculated in the fifteenth step 630 forms the upper limit on the lower bound. And if the integer program includes the replica constraint, the cost calculated in the seventeenth step 634 forms the upper limit on the lower bound.

According to an embodiment of the method of selecting the heuristic class, the lower limits comprise the lower bounds for the general and specific integer programs. In this embodiment, the upper limits provide a measure of confidence for the lower bounds. According to another embodiment of the method of selecting the heuristic class, the lower limit comprises the lower bound for the general integer program and the upper limit comprises the upper bound for the specific integer program. In this embodiment, the lower and upper bounds provide a worst case comparison between data placement irrespective of a data placement heuristic used to place the data and data placement according to a heuristic class modeled by the specific integer program.

According to an embodiment, the method of selecting the data placement heuristic of the present invention provides inputs for selecting heuristic parameters used in the method of instantiating the data placement heuristic of the present invention.

An embodiment of the method of instantiating the data placement heuristic comprises receiving heuristic parameters and running an algorithm to place data objects onto one or more nodes of a distributed storage system. According to an embodiment, the heuristic parameters comprise a cost function, a placement constraint, a metric scope, an approximation technique, and an evaluation interval. According to an alternative embodiment, the heuristic parameters comprise a plurality of placement constraints. According to another alternative embodiment, the heuristic parameters further comprise a routing knowledge parameter. According to another embodiment, the heuristic parameters further comprise an activity history parameter. By varying the heuristic parameters, the method of instantiating the data placement heuristic generates data placements corresponding to a wide range of data placements heuristics.

According to an embodiment, the heuristic parameters are defined with reference to the distributed storage system 100 (FIG. 1). The distributed storage system 100 comprises the first through fourth nodes, 102 ... 108, and the additional nodes 116, represented mathematically as the n nodes where $n \in \{1, 2, 3, \ldots, N\}$. The distributed storage system further comprises the clients 112. The clients 112 are represented mathematically as j clients where $j \in \{1, 2, 3, \ldots, J\}$. The data placement heuristics place the k data objects onto the n nodes where $k \in \{1, 2, 3, \ldots, K\}$. A jth client assigned to an nth node incurs a cost according to the cost function when accessing a kth data object. The distributed storage system 100 further comprises the network links and the additional network links, 110 and 114, which are represented mathematically as $l \in \{1, 2, 3, \ldots, L\}$.

The heuristic parameters are further defined according to problem definition constraints. A first problem definition constraint imposes a condition that each of the j clients sends a request for a kth data object to one and only one node. According to an embodiment, a request variable $y_{jnk}$ indicates whether the ith client sends a request for a kth data object to an nth node. According to an embodiment, the first problem definition constraint is given as follows.

$$\sum_{n \in N} y_{jnk} = 1 \; \forall n, k$$

A second problem definition constraint imposes a condition that only an nth node that stores a kth data object can respond to a request for the kth data object. According to an embodiment, a storage variable $store_{nk}$ indicates whether an nth node stores a kth data object. According to an embodiment, the second problem definition constraint is given as follows.

$$y_{jnk} \leq store_{nk} \; \forall j, n, k$$

Third and fourth problem definition constraints impose conditions that the request variable $y_{jnk}$ and the storage variable $store_{nk}$ comprise binary variables. According to an embodiment, the third and fourth problem definition constraints are given as follows.

$$y_{jnk}, store_{nk} \in \{0, 1\} \; \forall j, n, k$$

The cost function comprises a client perceived performance or an infrastructure cost. A goal of the data placement heuristic comprises optimizing the cost function. According to an embodiment, the cost function comprises a sum of distances traversed by j clients accessing n nodes to retrieve k data objects. According to an embodiment, the sum of the distances is given as follows.

$$\sum_{j \in C} \sum_{n \in N} \sum_{k \in K} reads_{jk} \cdot dist_{jn} \cdot y_{jnk}$$

where a read variable $reads_{jk}$ indicates a rate of read accesses by a jth client reading a kth data object and where a distance variable $dist_{jn}$ indicates the distance between the jth client and an nth node. According to an embodiment, the distance variable $dist_{jn}$ comprises a network latency between the jth client and the nth node. According to an alternative embodiment, the distance variable $dist_{jn}$ comprises a link cost between the jth client and the nth node.

According to an alternative embodiment, the cost function comprises a sum of distances traversed by j clients accessing n nodes to write k data objects. According to an embodiment, the sum of the distances is given as follows.

$$\sum_{j \in C} \sum_{n \in N} \sum_{k \in K} writes_{jk} \cdot dist_{jn} \cdot y_{jnk}$$

where a write variable $writes_{jk}$ indicates that a jth client writes a kth data object.

According to an alternative embodiment, the sum of the distances for retrievals is given as follows.

$$\sum_{j \in C} \sum_{n \in N} \sum_{k \in K} reads_{jk} \cdot dist_{jn} \cdot size_k \cdot y_{jnk}$$

where a size variable $size_k$ indicates a size of the kth data object.

According to an alternative embodiment, the cost function comprises a sum of storage costs for storing a kth data object on an nth node. According to an embodiment, the sum of the storage costs is given as follows.

$$\sum_{n \in N} \sum_{k \in K} sc_{nk} \cdot store_{nk}$$

where a storage cost variable $sc_{nk}$ indicates a cost of storing the kth data object on the nth node. According to embodiments, the storage cost variable $sc_{nk}$ indicates a size of the kth data object, a throughput of the nth node, or an indication that the kth data object resides at the nth node.

According to an alternative embodiment, the cost function comprises an access time, which indicates a most recent time that a kth data object was accessed on an nth node. According to another alternative embodiment, the cost function comprises a load time, which indicates a time of storage for a kth data object on an nth node. According to another alternative embodiment, the cost function comprises a hit ratio, which indicates a ratio of hits of transparent en route caches along a path from a jth client to an nth node.

The one or more placement constraints comprise a storage capacity constraint, a load capacity constraint, a node bandwidth capacity constraint, a link capacity constraint, a number of replicas constraint, a delay constraint, an availability constraint, or another placement constraint. According to an embodiment of the method of instantiating the data placement heuristic, each of the placement constraints are categorized as an increasing constraint, a decreasing constraint, or a neutral constraint. The increasing constraints are violated by allocating too many of the k data objects. The decreasing constraints are violated by not allocating enough of the k data objects. The neutral constraints are not capable of being characterized as an increasing or decreasing constraints and can be violated in situation which allocate too many of the k data objects or too few of the k data objects.

The storage capacity constraint places an upper limit on a storage capacity for an nth node. The storage capacity constraint comprises an increasing constraint. According to an embodiment, the storage capacity constraint is given as follows.

$$\sum_{k \in K} size_k \cdot x_{nk} \le SC_n \quad \forall\, n$$

where a storage capacity variable $SC_n$ indicates the storage capacity for the nth node.

The load capacity constraint places an upper limit on a rate of requests that an nth node can serve. The load capacity constraint comprises a neutral constraint. According to an embodiment, the load capacity constraint is given as follows.

$$\sum_{j \in C}\sum_{k \in K} reads_{jk} \cdot y_{jnk} \le LC_n \quad \forall\, n$$

where a load capacity variable $LC_n$ indicates the load capacity for the nth node. According to an alternative embodiment, the load capacity constraint is given as follows.

$$\sum_{j \in C}\sum_{k \in K} (reads_{jk} + writes_{jk}) \cdot y_{jnk} \le LC_n \quad \forall\, n$$

The node bandwidth capacity constraint places an upper limit on a bandwidth for an nth node. The node bandwidth capacity constraint comprises a neutral constraint. According to an embodiment, the node bandwidth capacity constraint is given as follows.

$$\sum_{j \in C}\sum_{k \in K} reads_{jk} \cdot size_k \cdot y_{jnk} \le BW_n \quad \forall\, n$$

where a bandwidth capacity variable $BW_n$ indicates the bandwidth for the nth node. According to an alternative embodiment, the bandwidth capacity constraint is given as follows.

$$\sum_{j \in C}\sum_{k \in K} (reads_{jk} + writes_{jk}) \cdot size_k \cdot y_{jnk} \le BW_n \quad \forall\, n$$

The link capacity constraint places an upper limit on a bandwidth between two nodes. The link capacity constraint comprises a neutral constraint. According to an embodiment, the link capacity constraint is given as follows.

$$\sum_{j \in C}\sum_{k \in K} reads_{jk} \cdot size_k \cdot z_{jlk} \le CL_l \quad \forall\, l$$

where an alternative access variable $z_{jlk}$ indicates whether a jth client uses an ith link to access a kth data object and where link capacity variable $CL_l$ indicates the bandwidth for the lth link. According to an alternative embodiment, the link capacity constraint is given as follows.

$$\sum_{j \in C}\sum_{k \in K} (reads_{jk} + writes_{jk}) \cdot size_k \cdot z_{jlk} \le CL_l \quad \forall\, l$$

The number of replicas constraint places an upper limit on the number of replicas. The number of replicas comprises an increasing constraint. According to an embodiment, the number of replicas constraint is given as follows.

$$\sum_{n \in N} x_{nk} \le P \quad \forall\, l$$

where a number of replicas variable P indicates the number of replicas.

The delay constraint places an upper limit on a response time for a jth client accessing a kth data object. The delay constraint comprises a decreasing constraint. The availability constraint places a lower limit on availability of the k data objects. The availability constraint comprises a decreasing constraint.

The metric scope comprises a client scope, a node scope, and an object scope. The client scope comprises the j clients considered by the data placement heuristic. The client scope ranges from local clients to global clients and includes regional clients, which comprise clients accessing a plurality of nodes within a region. The node scope comprises the n nodes considered by the data placement heuristic. The node scope ranges form a single node to all nodes and includes regional nodes. The object scope comprises the k data objects considered by the data placement heuristic. The object scope ranges from local objects (data objects stored on a local node) to global objects (all data objects stored within a distributed storage system) and includes regional objects.

The approximation technique places the k data objects with the goal of optimizing the cost function but without an assurance that the technique will provide an optimal cost value. According to embodiments, the approximation technique comprises a ranking technique, a threshold technique, an improvement technique, a hierarchical technique, a multi-phase technique, a random technique, or another approximation technique. As discussed above, the terms "heuristic" and "approximation technique" in the context of the present invention have a broad meaning and apply to both heuristics and approximation algorithms.

The ranking technique begins with determining costs from the cost function for all combinations of clients, nodes, and objects within the metric scope. Next, the ranking technique sorts the costs according to ascending or descending values. The ranking technique then takes a first cost, which represent a jth client accessing a kth data object from an nth node and makes a decision to place the kth data object onto the nth node according to the one or more placement constraints. If a decreasing constraint or a neutral constraint is violated prior to placing the kth data object onto the nth node, the kth data object is placed onto the nth node. If an increasing constraint or a neutral constraint is not violated prior to placing the kth data object onto the nth node, the kth data object is placed onto the nth node. The ranking technique continues to consider placements according to the sorted costs until all of the combinations of clients, nodes, and objects within the metric scope have been considered.

An alternative of the ranking technique comprises a greedy ranking technique. The greedy ranking technique comprises the ranking technique plus an additional step of recomputing the costs of remaining items in the sorted list and sorting the remaining items according to the recomputed costs after each placement decision.

The threshold technique comprises the ranking technique with the additional step of limiting the sorted list to costs above or below a threshold. The random technique comprises randomly placing the k data objects onto the n nodes.

The improvement technique comprises taking an initial placement of data objects on nodes and attempts to improve the initial placement by swapping placements of particular placements of objects on nodes. If the swapped placement provides a higher cost, the objects are returned to their previous placement. If an increasing constraint is violated with the swapped placement, the objects are returned to their previous placement. If a decreasing or neutral constraint was previously not violated but is violated with the swapped placement, the objects are returned to their previous placement. The improvement technique continues to swap object placements for a number of iterations.

The hierarchical technique comprises performing the ranking, threshold, or improvement technique at least twice where a following instance of the technique applies a broader metric scope. The multiphase technique comprises performing two of the approximation techniques in succession.

The evaluation interval comprises a measure of how often the method of instantiating the data placement heuristic is executed. According to an embodiment, the evaluation interval comprises a time period between executions of the data placement heuristic for one of the n nodes. According to another embodiment, the evaluation interval comprises a number of accesses by clients of a node such as every access or every tenth access.

The routing knowledge parameter comprises a specification for each of the n nodes regarding whether the node knows of the replicas stored on it or whether the node knows of all of the replicas stored within the distributed storage system or anything in between.

Figure 7A:
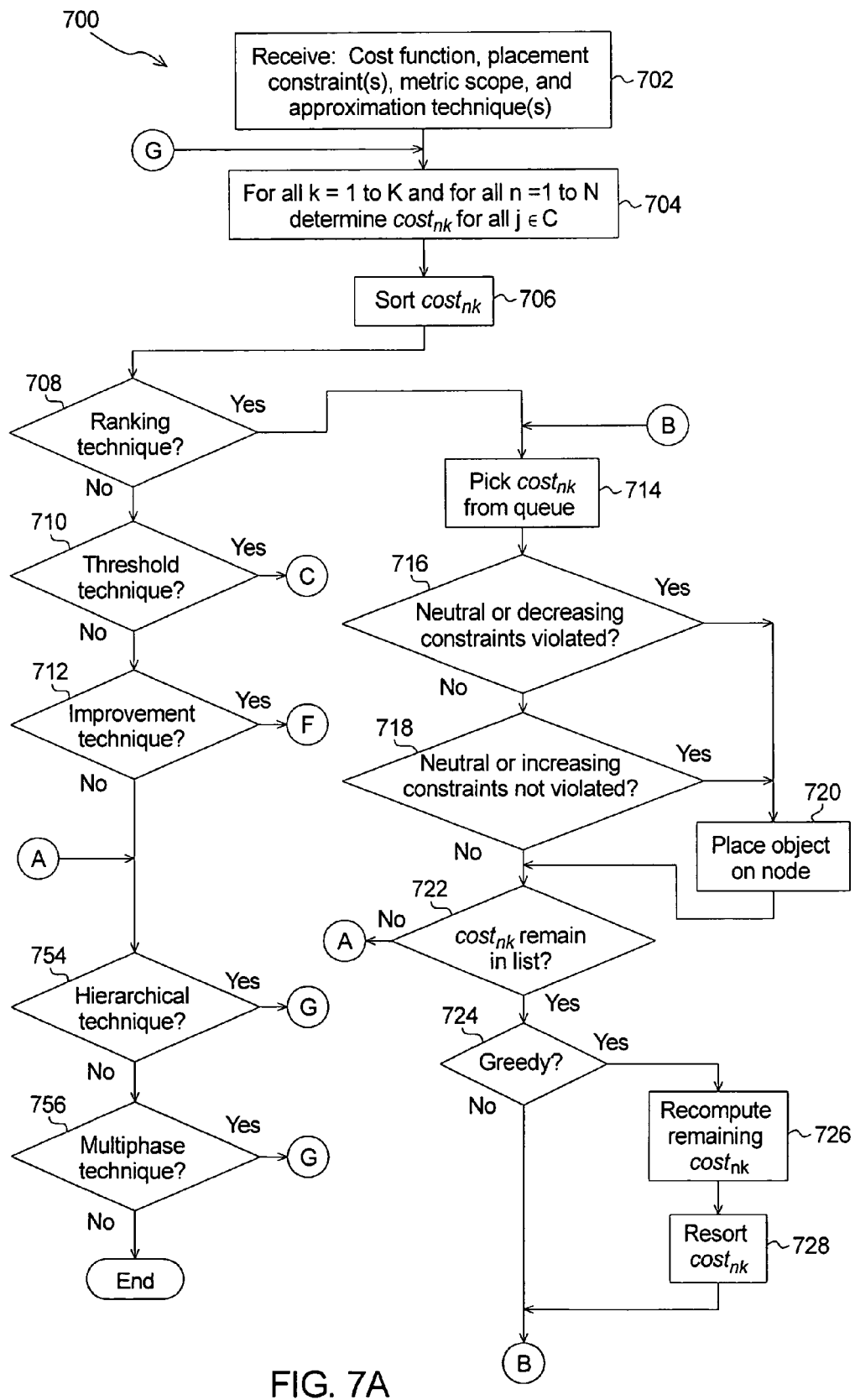
FIG. 7 illustrates an embodiment of a method of instantiating a data placement heuristic of the present invention as a flow chart.
Figures 7B, 7C:
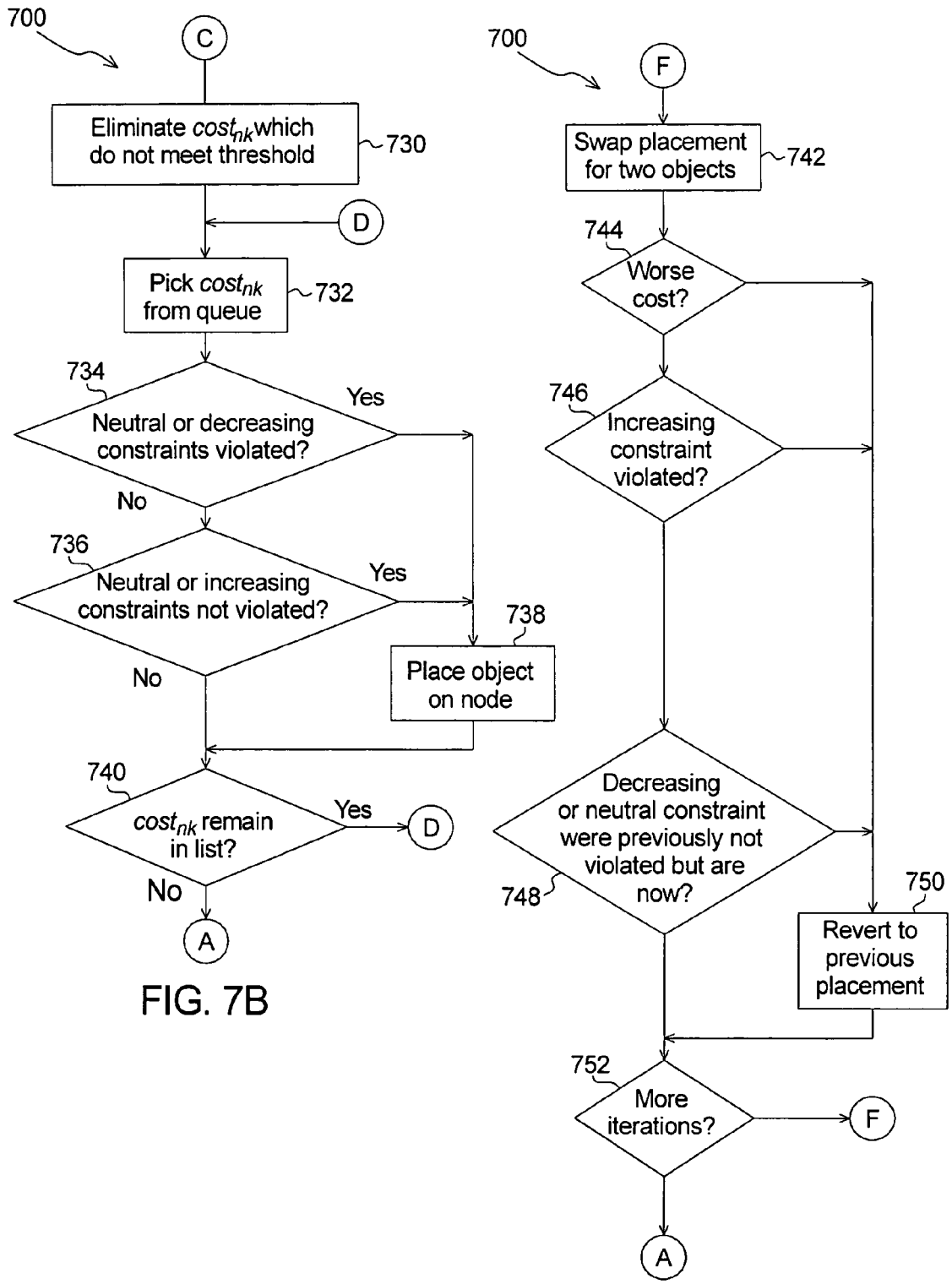

An embodiment of the method of instantiating the data placement heuristic is illustrated in FIGS. 7A, 7B, and 7C as a flow chart. The method 700 begins in a first step 702 of receiving the cost function, a set of placement constraints, the metric scope, and a set of approximation techniques. According to an embodiment, the set of placement constraints comprises a single placement constraint. According to another embodiment, the set of placement constraints comprises a plurality of placement constraints. According to an embodiment, the set of approximation techniques comprise a single approximation technique. According to another embodiment, the set of approximation techniques comprise a plurality of approximation techniques.

The method continues in a second step 704 of determining a cost according to the cost function for each combination of n nodes and k data objects within the metric scope. A third step 706 comprises sorting the costs in ascending or descending order as appropriate for the cost function, which forms a queue.

In fourth, fifth, or sixth steps, 708, 710, or 712, the method 700 chooses the ranking technique, the threshold technique, or the improvement technique, respectively. According to an alternative embodiment, the method 700 chooses the random technique. According to another alternative embodiment, the method 700 chooses another approximation technique.

If the method 700 chooses the ranking technique, a seventh step 714 picks a placement of a kth data object on an nth node corresponding to a cost at a head of the queue. An eighth step 716 determines whether a neutral or decreasing constraint is currently violated. If the neutral or decreasing constraint is currently not violated, a ninth step 718 determines whether a neutral or increasing constraint will not become violated by placing the kth data object on the nth node. If the eighth or ninth step, 716 or 718, provides an affirmative response, a tenth step 720 places the kth data object on the nth node. An eleventh step 722 determines whether the queue includes additional costs and, if so, the ranking technique continues.

The ranking technique continues in a twelfth step 724 of determining whether the ranking technique comprises a greedy technique. If so, a thirteenth step 726 recomputes the costs remaining in the queue and a fourteenth step 728 resorts the costs to reform the queue. The ranking technique then returns to the seventh step 714.

If the method 700 chooses the threshold technique, a fifteenth step 730 removes costs form the queue which do not meet a threshold. A sixteenth step 732 picks a placement of a kth data object on an nth node corresponding to the cost at a head of the queue. A seventeenth step 734 determines whether a neutral or decreasing constraint is currently violated. If the neutral or decreasing constraint is currently not violated, an eighteenth step 736 determines whether a neutral or increasing constraint will not become violated by placing the kth data object on the nth node. If the seventeenth or eighteenth step, 734 or 736, provides an affirmative response, a nineteenth step 738 places the kth data object on the nth node. A twentieth step 740 determines whether the queue includes additional costs and, if so, the threshold technique continues.

If the method 700 chooses the improvement technique in the sixth step 712, an initial placement of the k data objects on the n nodes within the metric scope has preferably been determined using the ranking or threshold technique. Alternatively, the initial placement of the k data objects on the n nodes within the metric scope is determined using the random technique. Alternatively, the initial placement of the k data objects on the n nodes within the metric scope is determined using another technique. Since the improvement technique begins with the initial placement of the k data objects placed on the n nodes, the improvement technique forms part of the multiphase technique where a first phase comprises the ranking, threshold, random, or other technique and where a second phase comprises the improvement technique.

In a twenty-first step 742, the improvement technique swaps a placement of two of the k data objects within the metric scope, which forms a swapped placement. A twenty-second step 744 determines whether the swapped placement incurs a worse cost. A twenty-third step 746 determines whether the swapped placement violates an increasing constraint. A twenty-fourth step 748 determines whether a neutral or decreasing constraint is violated and whether the placement prior to swapping did not violate the neutral or decreasing constraint. If the twenty-first, twenty-second, or twenty-third step, 742, 744, or 746, provides an affirmative response, a twenty-fifth step 750 reverts the placement to the placement prior to swapping. A twenty-sixth step 752 determines whether to perform more iterations of the improvement technique. If so, the improvement technique returns to the twenty-first step 742.

In a twenty-seventh step 754, the method 700 determines whether to perform the hierarchical technique and, if so, the method 700 returns to the second step 704 with a broader metric scope. In a twenty-eighth step 756, the method 700 determines whether to perform the multiphase technique and, if so, the returns to the second step 704 to begin a next phase of the multiphase technique.

According to an embodiment, the method of instantiating the data placement heuristic along with the method of selecting the heuristic class forms the method of determining the data placement of the present invention.

Figure 8:
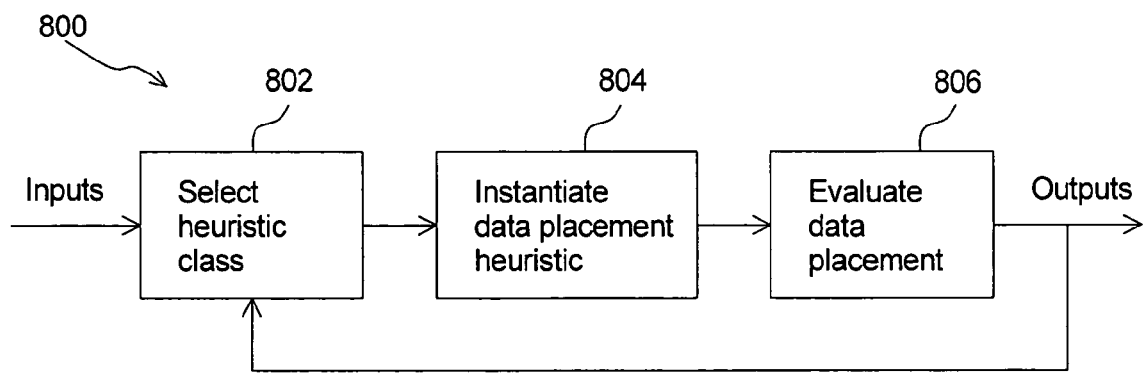
FIG. 8 illustrates an embodiment of a method of determining data placement of the present invention as a block diagram.

An embodiment of the method of determining the data placement of the present invention is illustrated in FIG. 8 as a block diagram. The method 800 begins by inputting a workload, a system configuration, and a performance requirement to a first block 802, which select a heuristic class. A second block 804 receives the heuristic class and instantiates a data placement heuristic resulting in a placement of data objects on nodes of a distributed storage system. A third block 806 evaluates the data placement by applying a workload to the distributed storage system and measuring a performance and a replication cost, which are provided as outputs. According to an embodiment of the method 800, the outputs are provided to the first block 802, which begins an iteration of the method 800. In this embodiment, the method 800 functions as a control loop.

According to an embodiment of the method 800, the distributed storage system comprises an actual distributed storage system. In this embodiment, the method 800 functions as a component of the distributed storage system. According to another embodiment of the method 800, the distributed storage system comprises a simulation of a distributed storage system. According to this embodiment, the method 800 functions as a simulator. According to an embodiment that functions as the component of the actual distributed storage system, the outputs comprise an actual workload, the performance, and the replication cost. According to an embodiment that functions as the simulator, the outputs comprise the performance and the replication cost. According to another embodiment that functions as the simulator, the outputs comprise the workload, the performance, and the replication cost. According to another embodiment that functions as the simulator, the outputs comprise the system configuration, the performance, and the replication cost.

According to an embodiment of the method 800, the first block 802 receives the inputs and selects the heuristic class. In an embodiment, the first block 802 provides the heuristic class to the second block 804 as a single parameter indicating the heuristic class. For example, the single parameter could indicate one of the heuristic classes identified in Table 3 (FIG. 8), such as storage constrained heuristics or local caching. In another embodiment, the first block 802 provides the heuristic class to the second block 804 as the heuristic parameters of the method of instantiating the data placement heuristic. In this embodiment, the first block 802 sets some of the heuristic parameters to defaults because the heuristic class does not specify these parameters. In an alternative of this embodiment, the first block 802 provides some of the heuristic parameters to the second block 804 and the second block 804 assigns defaults to the heuristic parameters not provided by the first block 802.

According to an embodiment of the method 800, the second block 804 instantiates the data placement heuristic for each evaluation interval within an execution of the second block 804. For example, if the evaluation interval is one hour and the execution is twenty four hours, the second block instantiates the data placement heuristic every hour for the twenty four hours. According to this example, the outputs from the third block 806 comprise the performance and the replication cost for twenty four instantiations of the data placement heuristic. According to another example, the evaluation interval is twenty-four hours and the execution is twenty-four hours. According to this example, the outputs from the third block 806 comprise the performance and the replication cost for a single instantiation of the data placement heuristic.

According to an embodiment of the method 800 that functions as the component of the distributed storage system and which operates as the control loop, a first operation of the control loop begins with the inputs comprising an anticipated workload, the system configuration, and the performance requirement. Second and subsequent operations of the control loop use an actual workload, the performance, and the replication cost from the third block 806 to improve operation of the distributed storage system. According to an embodiment, the control loop improves the performance by tuning the heuristic parameters provided by the first block 802 to the second block 804. According to this embodiment, the heuristic parameters tuned by the first block 804 comprise previously provided heuristic parameters or previously provided defaults. According to another embodiment, the control loop improves the performance by keeping a history of actual workloads so that the first block 802 provides the heuristic parameters to the second block based upon time, such as by hour of day or day of week. According to this embodiment, the second block instantiates different data placement heuristics depending upon the time.

According to an embodiment of the method 800 that functions as the simulator and which operates as the control loop, a first operation of the control loop begins with the inputs comprising an initial workload, the system configuration, and the performance requirement. In this embodiment, the third block 806 outputs the workload, the performance, and the replication cost. Second and subsequent operations of the control loop vary the workload in order to identify heuristic parameters that instantiate a data placement heuristic that operates well under a range of workloads.

According to another embodiment of the method 800 that functions as the simulator and which operates as the control loop, a first operation of the control loop begins with inputs comprising the workload, an initial system configuration, and the performance requirement. In this embodiment, the third block 806 outputs the system configuration, the performance, and the replication cost. Second and subsequent operations of the control loop vary the system configuration in order to identify a particular system configuration that operates well under the workload.

According to another embodiment of the method 800 that functions as the simulator and which operates as the control loop, a first operation of the control loop begins with inputs comprising an initial workload, an initial system configuration, and the performance requirement. In this embodiment, the third block outputs the workload, the system configuration, the performance, and the replication cost. Second and subsequent operations of the control loop vary the workload or the system configuration in order to identify a particular system configuration and a data placement heuristic that operates well under a range of workloads.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of selecting a heuristic class for data placement in a distributed storage system comprising the steps of:
    forming an integer program for each of a plurality of heuristic classes, each of the heuristic classes providing a technique for placing data within the distributed storage system, each of the integer programs comprising an objective of minimizing a replication cost for placing the data;
    solving each of the integer programs which provide the replication cost for each of the heuristic classes; and
    selecting the heuristic class having a low replication cost.

2. A method of selecting a heuristic class for data placement in a distributed storage system comprising the steps of:
    forming a general integer program which models placing data within the distributed storage system;
    forming a specific integer program which models a heuristic class that provides a technique for placing the data within the distributed storage system, the general and specific integer programs each comprising an objective of minimizing a replication cost for placing the data;
    solving the general integer program which provides a general lower bound for the replication cost;
    solving the specific integer program which provides a specific lower bound for the replication cost; and
    selecting the heuristic class if a difference between the general lower bound and the specific lower bound is within an allowable amount.

3. The method of claim 2 wherein inputs used in the steps of forming the general and specific integer programs comprise a system configuration, a workload, and a performance requirement.

4. The method of claim 3 wherein the performance requirement comprises a bi-modal performance metric.

5. The method of claim 4 wherein the bi-modal performance metric comprises a criterion and a ratio of successful attempts to total attempts.

6. The method of claim 3 wherein the performance requirement comprises a data access latency.

7. The method of claim 3 wherein the performance requirement comprises a data access bandwidth.

8. The method of claim 3 wherein the performance requirement comprises a data update time.

9. The method of claim 3 wherein the performance requirement comprises an average data access latency.

10. The method of claim 3 wherein the performance requirement comprises a data availability requirement.

11. The method of claim 3 wherein the general integer program comprises general constraints which model the data placement irrespective of the heuristic class for the data placement.

12. The method of claim 11 wherein the general constraints comprise a performance constraint which models the performance requirement.

13. The method of claim 11 wherein the specific integer program comprises the general constraints and a specific constraint.

14. The method of claim 12 wherein the specific constraint comprises a storage constraint.

15. The method of claim 12 wherein the specific constraint comprises a replica constraint.

16. The method of claim 12 wherein the specific constraint comprises a routing knowledge constraint and further wherein the routing knowledge constraint models an extent to which a data storage node knows of replicas of data objects stored on other data storage nodes.

17. The method of claim 12 wherein the specific constraint comprises an access knowledge constraint and further wherein the access knowledge constraint models an extent to which a data storage knows of access to replicas of data objects by clients accessing other data storage nodes.

18. The method of claim 12 wherein the specific constraint comprises an activity history constraint.

19. The method of claim 12 wherein the specific constraint comprises a reactive placement constraint.

20. The method of claim 3 wherein the system configuration comprises a plurality of data storage nodes coupled by a plurality of network links.

21. The method of claim 20 wherein the system configuration further comprises a plurality of clients coupled to the data storage nodes.

22. The method of claim 21 wherein the workload comprises at least some of the clients requesting data objects stored on the data storage nodes.

23. The method of claim 22 wherein the workload further comprises at least some of the clients storing some of the data objects on the data storage nodes.

24. A method of selecting a heuristic class for data placement in a distributed storage system comprising the steps of:
    forming a general integer program which models placing data within the distributed storage system;
    forming a plurality of specific integer programs which model a plurality of heuristic classes, each of the heuristic classes providing a technique for placing the data within the distributed storage system, the general and specific integer programs each comprising an objective of minimizing a replication cost for placing the data;
    solving the general integer program which provides a lower bound for the replication cost;
    solving the specific integer programs which provides the replication cost for each of the heuristic classes; and
    selecting a particular heuristic class correlated to a low replication cost if a difference between the lower bound and the low replication cost is within an allowable amount.

25. A computer readable memory comprising computer code for implementing a method of selecting a heuristic class for data placement in a distributed storage system, the method of selecting the heuristic class comprising the steps of:
    forming an integer program for each of a plurality of heuristic classes, each of the heuristic classes providing a technique for placing the data within the distributed storage system, each of the integer programs comprising an objective of minimizing a replication cost for placing the data;
    solving each of the integer programs which provide the replication cost for each of the heuristic classes; and
    selecting the heuristic class having a low replication cost.

26. A computer readable memory comprising computer code for implementing a method of selecting a heuristic class for data placement in a distributed storage system, the method of selecting the heuristic class comprising the steps of:
- forming a general integer program which models placing data within the distributed storage system;
- forming a specific integer program which models a heuristic class that provides a technique for placing the data within the distributed storage system, the general and specific integer programs each comprising an objective of minimizing a replication cost for placing the data;
- solving the general integer program which provides a general lower bound for the replication cost;
- solving the specific integer program which provides a specific lower bound for the replication cost; and
- selecting the heuristic class if a difference between the general lower bound and the specific lower bound is within an allowable amount.

27. A computer readable memory comprising computer code for implementing a method of selecting a heuristic class for data placement in a distributed storage system, the method of selecting the heuristic class comprising the steps of:
- forming a general integer program which models placing the data within the distributed storage system;
- forming a plurality of specific integer programs which model a plurality of heuristic classes, each of the heuristic classes providing a technique for placing the data within the distributed storage system, the general and specific integer programs each comprising an objective of minimizing a replication cost for placing the data;
- solving the general integer program which provides a lower bound for the replication cost;
- solving the specific integer programs which provides the replication cost for each of the heuristic classes; and
- selecting a particular heuristic class correlated to a low replication cost if a difference between the lower bound and the low replication cost is within an allowable amount.

* * * * *

UNITED STATES PATENT AND TRADEMARK OFFICE
CERTIFICATE OF CORRECTION

PATENT NO. : 7,315,930 B2
APPLICATION NO. : 10/698182
DATED : January 1, 2008
INVENTOR(S) : Magnus Karlsson et al.

It is certified that error appears in the above-identified patent and that said Letters Patent is hereby corrected as shown below:

In column 18, line 10, delete "ith" and insert -- lth --, therefor.

In column 18, line 26, delete "$\forall l$" and insert -- $\forall k$ --, therefor.

Signed and Sealed this

Tenth Day of June, 2008

JON W. DUDAS
*Director of the United States Patent and Trademark Office*